Dec. 19, 1933.  A. P. THOMAS  1,940,471
BRAKE
Filed Oct. 29, 1931
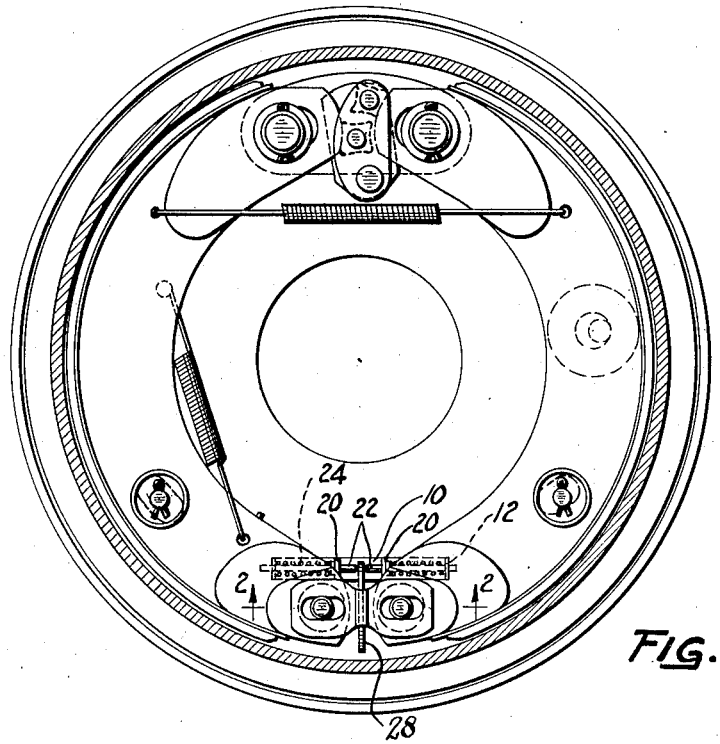
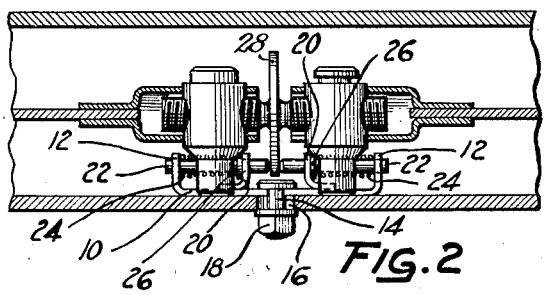
INVENTOR.
ARCHIBALD P. THOMAS
BY
ATTORNEYS.

Patented Dec. 19, 1933

1,940,471

UNITED STATES PATENT OFFICE

1,940,471
BRAKE

Archibald Percy Thomas, Birmingham, England, assignor to Bendix Aviation Corporation, South Bend, Ind., a corporation of Delaware Application October 29, 1931, Serial No. 571,881, and in Great Britain October 29, 1930

10 Claims. (Cl. 188—79.5)

This invention relates to improvements in vehicle brakes and comprises an improvement in or modification of the invention as set forth in the specification of British Patent No. 339,505 of 1929.

In that specification there is described a means for automatically centralizing within a brake drum a brake-band or a pair of brake shoes which have a limited circumferential movement with respect to a fixed back-plate on engagement with the inner surface of the drum.

The means described consists of co-acting members slidably mounted on a stationary part of the brake assembly and urged towards each other by a spring or springs against stops to return to a constant position a peg or other projection located between them and carried by the band or shoes at a point remote from the cam or the like by which the brake is applied.

Thus when the brake is released the band or shoes will always return to a position in which the peripheral braking surface is concentric with the inner surface of the drum and shoe clearance can be kept to a minimum without risk of rubbing or dragging of the brakes.

The object of the present invention is to provide an extremely simple and readily manufactured form of this centralizing device which is selfsetting and is particularly adapted for use with a brake in which the ends of the shoes remote from the cam or other operating means are connected by a turnbuckle or the like provided with a toothed wheel or disc for rotating it to adjust the brake shoes.

According to the present invention a frame member for the centralizing device is formed by a metal strip or pressing adapted to be adjustably secured to the backplate of the brake assembly by a single belt or stud. An upturned lug is provided at each end of the strip and two further lugs are formed on or secured to the strip a short distance on each side of its centre.

The lugs are pierced to receive two rods or plungers which are free to slide therein, and a coiled spring fitting over each plunger abuts between the outer lug and a collar on the plunger to force the collar against the inner lug. The inner ends of the plunger are then spaced apart at such a distance that the adjusting disc for the shoes or a part associated therewith just fits between them, and when the shoes are free the springs on the plungers will always retain the shoes in the initial position to which they have been set by the positioning of the frame member.

One practical form of automatic centralizing device in accordance with the present invention is illustrated in the accompanying drawing, in which:—

Figure 1 is a vertical sectional view of a brake illustrating the invention as applied; and Figure 2 is a sectional view substantially on line 2—2 Figure 1.

In the arrangement illustrated the frame for the centralizing device is formed by a pressed metal strip 10 of which the ends are turned up at right angles to form lugs 12. The frame is held in position by a short bolt 14 having a shank with opposed flats passing through a clearance hole of complementary cross-section in the frame so that it is held against rotation and through a slot 16 in the back-plate of substantial length in a direction at right angles to a radius passing through the bolt so as to give a reasonable range of adjustment, and a washer and nut 18 are fitted on the outer end of the bolt behind the back-plate.

Further lugs 20 on the frame spaced from the end lugs 12 are formed by small pressings welded to the frame or may be formed by piercing and cranking up portions of the strip itself. The lugs 16 and 20 are pierced to receive plungers 22 which are free to slide therein and are preferably formed by short lengths of cylindrical metal rod. A coiled spring 24 fitting over each plunger abuts between the lug 12 and a collar 26 on the plunger to force the collar against the inner lug 20 and this collar may be formed by a slitted washer closed into an annular groove on the rod to facilitate assembly.

The length of the plungers is such that when the plungers are in their normal positions, the collars 26 abut against the lugs 20. The inner ends of the plungers are spaced apart at such a distance that the adjusting disc 28 for the shoes or a part associated therewith just fits between them, and when the shoes are free the springs on the plungers will always retain the shoes in the initial position to which they have been set by the positioning of the frame member 10.

To effect this initial setting the nut 18 which secures the frame member to the back-plate is slackened off and the shoes are adjusted into contact with the drum. The springs 24 on the plungers are of sufficient strength to move the frame into a position such that the collars 26 on both plungers are held against the inner lugs, and the nut 18 is then tightened up to secure the frame in this position. Thus when the shoes are adjusted back to their normal clearance the plungers will automatically centralize them and the setting of the frame need not again be interfered with.

The whole assembly for the centralizing device as illustrated consists simply of three small sheet metal pressings, two lengths of rod, two washers, two coiled springs, and a bolt and nut, and the device lends itself to rapid production on extremely economical lines.

Having thus described the various features of the invention, what I claim as new and desire to secure by Letters Patent is:

1. A centralizing device comprising a support, and opposed spring pressed members on the support, the support and said members being arranged to form a subassembly unit with the path of said members fixed by the support.

2. A centralizing device comprising a movable support, and opposed spring pressed members carried by the support, the support and said members being arranged to form a subassembly unit with the path of said members fixed by the support.

3. A centralizing device comprising a slidable frame, means for securing the frame in a fixed position, and opposed spring pressed members carried by the frame and movable in paths fixed by the frame.

4. A centralizing device comprising a slidable frame, means for securing the frame in a fixed position, opposed plungers supported by the frame, and springs for urging the plungers toward each other.

5. A centralizing device comprising a slidable frame, means for securing the frame in position, lugs on the frame, plungers supported by the lugs, and springs on the plungers for urging the plungers toward each other.

6. A centralizing device comprising a frame, spaced lugs on the frame, opposed plungers supported by the lugs, collars on the plungers, and springs on the plungers engaging the collars for urging the plungers toward one another.

7. A centralizing device comprising a slidable frame, means for securing the frame in a fixed position, spaced lugs arranged in pairs, a plunger supported by each pair of lugs, a collar on each plunger, and a coil spring on each plunger urging the plungers toward each other.

8. A brake comprising a fixed support, friction elements on the support, an adjusting member connecting the friction elements, a centralizing device including a frame slidable on the support, means for securing the frame in a fixed position, and opposed spring pressed plungers supported by the frame.

9. A brake comprising a fixed support, friction elements movable on the support, an adjusting screw connecting the friction elements, a frame slidable on the support, means for securing the frame in a fixed position, and opposed spring pressed plungers on the frame engaging the adjusting screw.

10. A brake comprising a fixed support, friction elements movable on the support, an adjusting screw connecting the friction elements, a frame slidable on the fixed support, means for securing the frame in a fixed position, and opposed spring pressed plungers carried by the frame and engaging parts of the adjusting screw to centralize the friction elements.

ARCHIBALD PERCY THOMAS.